United States Patent [19]

Lyle

[11] 3,978,972

[45] Sept. 7, 1976

[54] CAN INVERTING AND CLEANING APPARATUS

[75] Inventor: Frank E. Lyle, Duluth, Ga.

[73] Assignee: American Home Products Corporation, New York, N.Y.

[22] Filed: Aug. 22, 1974

[21] Appl. No.: 499,708

[52] U.S. Cl. ............................... 198/836; 198/679; 214/6 FS; 198/690; 198/778
[51] Int. Cl.² .......................................... B65G 17/46
[58] Field of Search ............... 198/41, 103, DIG. 13, 198/25, 30, 209, 211, 162, 167; 221/212; 15/303; 214/6 DS, 6 FS

[56] References Cited
UNITED STATES PATENTS

| 1,952,418 | 3/1934 | Chapman | 198/103 |
| 3,032,798 | 5/1962 | McHugh, Jr. et al. | 198/103 X |
| 3,556,847 | 1/1971 | Prodzenski | 198/162 X |
| 3,565,234 | 2/1971 | Birdsong | 198/41 |
| 3,583,544 | 6/1971 | Prodzenski | 198/25 |

*Primary Examiner*—Robert J. Spar
*Assistant Examiner*—James M. Slattery
*Attorney, Agent, or Firm*—Joseph Martin Weigman

[57] ABSTRACT

The disclosure is directed to apparatus for inverting ferromagnetic containers so that foreign matter contained in them may fall free or be blown free while they are in the inverted position. The containers are then returned to the upright position and transferred to further operating stations.

4 Claims, 2 Drawing Figures

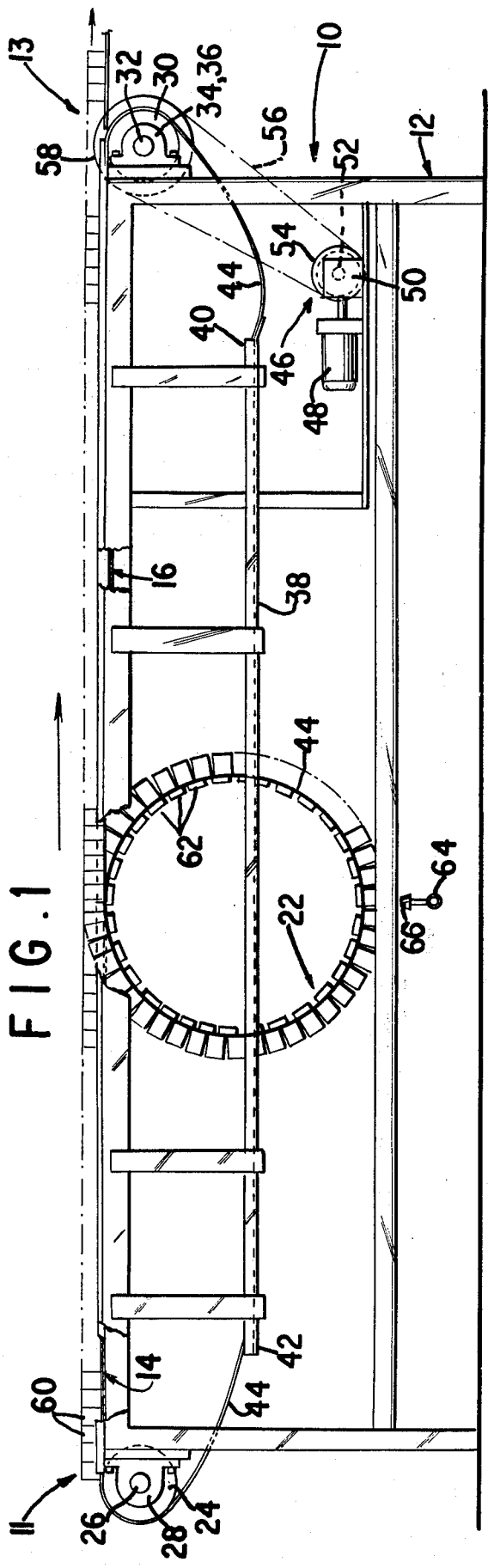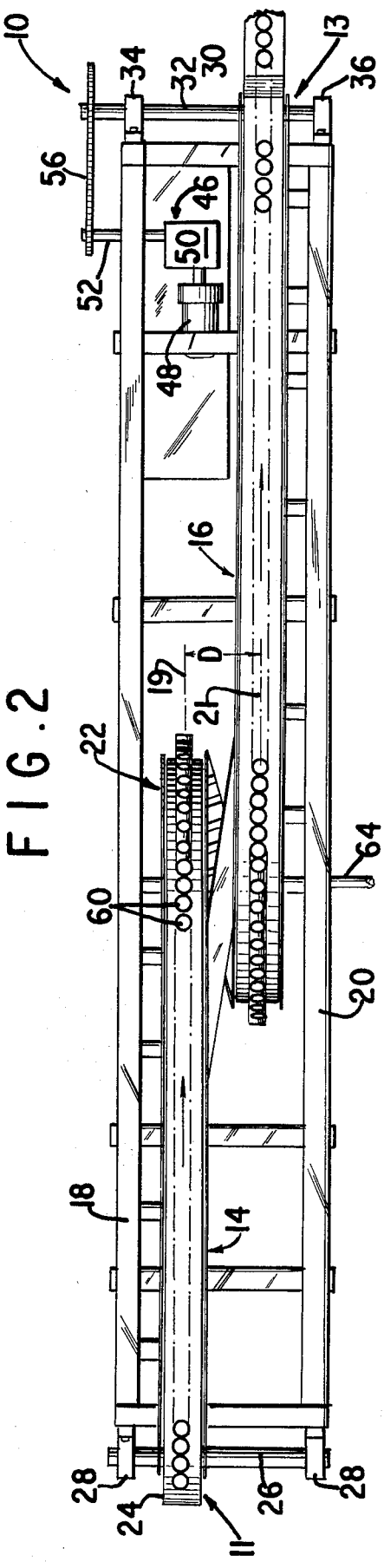

CAN INVERTING AND CLEANING APPARATUS

The present invention is directed to apparatus for conveying, inverting and cleaning ferromagnetic containers prior to filling. More particularly, the invention is directed to production line apparatus to invert empty containers so that foreign matter may be removed from them prior to filling.

In the metal container art it is the practice for the container manufacturer to package empty containers in cardboard cartons from shipment to the filler. At the filler's plant the empty containers are removed, usually by inverting the cardboard cartons onto a roller table which then alines the containers and permits them to pass out single file to further processing stations. During shipment, foreign matter such as dust and cardboard fragments find their way into the containers. Such foreign matter may be removed by inverting the container or by blowing the foreign matter out of the container. One of the problems in the art is to perform the inverting or air blowing steps or both, at a speed and under controlled conditions which are compatible with high-speed filling operations.

It is an object of the present invention to provide apparatus for cleaning empty containers.

It is a further object of the present invention to provide apparatus for inverting ferromagnetic containers and returning them to the upright position.

It is still another object of the present invention to provide means to blow foreign matter from empty containers while they are in an inverted position and at production line speed.

Other and further objects of the invention will be apparent to those skilled in the art from reading the following description in conjunction with the drawings in which:

FIG. 1 is an elevational view of a preferred embodiment of the present invention; and FIG. 2 is a plan view of the same embodiment.

The objects of the present invention may be achieved with an apparatus which is composed of a support structure, a first horizontal endless belt support means supported by the structure, a second horizontal endless belt support means supported by the structure parallel to the first support means and having its feed end disposed a predetermined distance from the discharge end of the first support means. A third vertically curved endless belt support means is connected at its feed end to the discharge end of the first support means and curves through 360 degrees vertically to connect at its discharge end to the feed end of the second support means. A plurality of magnets are preferably connected to the inner surface of the third support means. A first sheave is connected to the support structure adjacent to the feed end of the first support means. A second sheave is connected to the support structure adjacent to the discharge end of the second support means. A fourth endless belt support means is positioned between the first and second sheaves and at an angle to the first and second support means to support the endless belt returning from the second to the first support means. The fourth support means passes through the center of the third support means. An endless belt is positioned over the sheaves and on the first, second, third and fourth support means so as to pass continuously around them. A drive means is operatively connected to drive the endless belt.

In the preferred embodiment, a compressed air line is positioned adjacent the lowest point of the third support means and is adapted to direct a stream of air into containers as they pass.

As may be seen in the drawings, the inverting apparatus 10 is comprised of a supporting structure 12 having a feed end 11 and a discharge end 13 and consisting of a plurality of structural members which may be angle iron or channels as is well known in the art. A first endless belt support means 14 is supported by the structure 12 and extends from the feed end 11 to a position near the center of the structure being located closer to one side 18 of the structure than to the other side 20. A second endless belt support means 16 is supported by the structure 12 and extends from near the middle of the structure to the discharge end and is closer to the second side 20 than the first side 18 of the structure. The second support means 16 is parallel to the first support means but spaced apart from it by a distance D between center lines 19 and 21 as shown in FIG. 2. A third support means 22 is connected at its feed end to the discharge end of the first support means 14 and at its discharge end to the feed end of the second support means 16. The third support means is a portion of a helix and curves downwardly from the first support means through a complete 360 degree circle to connect with the second support means as may be seen in the drawings. A first sheave 24 is supported by the structure 12 by a shaft 26 and pillow blocks, or bearings, 28. The first sheave 24 is positioned adjacent the feed end of the first support means.

A second sheave 30 is supported from the structure 12 by a shaft 32 and pillow blocks 34, 36. A fourth endless belt support means 38 is supported from the structure 12 with one end 40 adjacent the second sheave 30 and the other end 42 adjacent the first sheave 24. The fourth support means is disposed at an angle to the first support means 14 and second support means 16 and passes through the center of the third support means 22 as may be seen in the drawings. An endless belt 44 is disposed around the support means and the sheaves and adapted to move through an endless path defined by the support means and sheaves. In a preferred embodiment the endless belt 44 is a chain such as Rex D880K 3¼. Rex LF Acetal chain. A drive means 46 in the preferred embodiment consists of an electric motor 48 and a gear reducer 50 supported from the structure 12. A first sprocket 54 is connected to the gear reducer output shaft 52 and is coupled by a chain 56 to a second sprocket 58 mounted on the shaft 32 which serves to drive the sheave 30. In a preferred embodiment the drive sheave is a chain sprocket, such as Rex Chain Sprocket.

At the feed end 11 of the structure 12 are introduced empty ferromagnetic containers such as topless steel cans 60. The containers 60 are transported by the belt 44 along the first belt support means 14 and around the third belt support means 22. A plurality of magnets 62 are supported on the inner surface of the third support means 22 and attract the ferromagnetic containers and hold them to the belt 44 as the belt passes around the third support means 22. The belt 44 transports the containers 60 over the second belt support means 16 to the discharge end 13 of the structure 12.

In a preferred embodiment a compressed air line 64 is supported adjacent the lowest point of the third support means 22 and is adapted to direct a stream of air into the inverted containers 60 at this point. If desired a nozzle 66 may be provided to shape the air flow to a predetermined pattern.

In use the empty containers 60 are fed onto the endless belt 44 with the open end upright. The containers pass around the third support means and a stream of air blows out any foreign matter which may be present in them. The cans are reinverted and discharged from the inverting apparatus at the discharge end to a further operating station, such as filling.

What is claimed is:

1. Apparatus for inverting open ended, ferromagnetic articles comprising:
    A. a support structure;
    B. a helical support member supported from said support structure;
    C. a plurality of magnets coupled to the inside of said helical support member;
    D. an endless belt;
    E. means to move said belt from one end of said support structure to the other while passing around the outside of said helical support member and maintaining the open ends of the ferromagnetic articles continuously facing away from said helical support member.

2. Apparatus for inverting open ended, ferromagnetic articles comprising:
    A. a support structure;
    B. a first horizontal endless belt support means connected to said structure;
    C. a second horizontal endless belt support means connected to said structure, parallel to said first support means having its feed end disposed a predetermined distance from the discharge end of said first support means;
    D. a third vertically curved endless belt support means connected at the feed end to the discharge end of said first support means and curving vertically through 360 degrees to connect at the discharge end to the feed end of said second support means;
    E. a plurality of magnets connected to the inner surface of said third support means;
    F. an endless belt supported in its travel by said first, second and third support means and supporting the ferromagnetic articles with the open ends continuously directed away from said third support means as the articles move around said third support means;
    G. means to move said belt endlessly across said support means.

3. Apparatus as defined in claim 2 further comprising a return belt support means supported from said structure in spaced relation to the discharge end of said second support means and the feed end of said first support means and disposed through the center of said third support means.

4. Apparatus as defined in claim 2 wherein said means to move further comprises:
    A. a first sheave supported in said structure in operative relation with the feed end of said first support means;
    B. a second sheave supported on said structure in operative relation with the discharge end of said second support means; and
    C. a drive means operatively coupled to said endless belt.

* * * * *